(12) United States Patent
Berk et al.

(10) Patent No.: US 6,758,993 B2
(45) Date of Patent: Jul. 6, 2004

(54) SYSTEM AND METHOD FOR MINIMIZING CURE-INDUCED RESIDUAL STRESS IN AN EPOXY IMPREGNATED IGNITION COIL

(75) Inventors: Carleton L. Berk, Indianapolis, IN (US); John D. Phillips, Pendleton, IN (US); Diane E. Hageman, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 41 days.

(21) Appl. No.: 10/124,799

(22) Filed: Apr. 17, 2002

(65) Prior Publication Data

US 2003/0197297 A1 Oct. 23, 2003

(51) Int. Cl.[7] .................... B29C 45/20; B29C 45/14; B29C 45/78
(52) U.S. Cl. .................. 264/40.6; 264/272.19; 424/143
(58) Field of Search .............. 264/40.6, 272.11, 264/272.19, 272.2; 425/117, 143, 544; 336/90, 96; 29/602.1, 605, 606; 123/634, 635

(56) References Cited

U.S. PATENT DOCUMENTS

| | | | | |
|---|---|---|---|---|
| 5,109,209 A | * | 4/1992 | Ida et al. | 336/96 |
| 5,149,483 A | * | 9/1992 | Okey et al. | 264/272.19 |
| 5,740,787 A | | 4/1998 | Ando | 123/635 |
| 6,030,713 A | | 2/2000 | Hollstein et al. | 428/620 |
| 6,087,918 A | | 7/2000 | Henry et al. | |
| 6,103,157 A | * | 8/2000 | Behm et al. | 264/102 |
| 6,156,264 A | | 12/2000 | Johnston et al. | |
| 6,178,957 B1 | | 1/2001 | Widiger et al. | 123/634 |
| 6,188,304 B1 | | 2/2001 | Skinner et al. | |
| 6,215,385 B1 | | 4/2001 | Ogden | |
| 6,216,679 B1 | | 4/2001 | Skinner et al. | |
| 6,232,863 B1 | | 5/2001 | Skinner et al. | |
| 6,276,348 B1 | | 8/2001 | Skinner et al. | |
| 6,332,998 B1 | * | 12/2001 | Yamagata et al. | 264/496 |
| 6,422,225 B1 | | 7/2002 | Hamer et al. | |
| 6,437,674 B1 | | 8/2002 | Hamer et al. | |
| 6,469,608 B2 | * | 10/2002 | Shimoide et al. | 336/90 |
| 6,556,116 B2 | | 4/2003 | Skinner et al. | |
| 6,556,118 B1 | | 4/2003 | Skinner | |
| 6,615,811 B1 | | 9/2003 | Butler et al. | |
| 6,622,711 B1 | | 9/2003 | Skinner et al. | |
| 6,679,236 B2 | * | 1/2004 | Skinner et al. | 123/634 |

* cited by examiner

Primary Examiner—Angela Ortiz
(74) Attorney, Agent, or Firm—Jimmy L. Funke

(57) ABSTRACT

A system and method is disclosed that uses an empirically-derived thermal transfer function for an ignition coil taken with respect to an ambient temperature and responsive internal temperatures. The system combines the transfer function with a minimum cure-induced stress profile, in order to obtain a time-temperature profile for minimizing cure-induced residual stress in an epoxy resin impregnated ignition coil. An accelerated minimal-stress profile is obtained by increasing an initial gel isotherm temperature of the above-mentioned time-temperature profile.

15 Claims, 3 Drawing Sheets

SYSTEM AND METHOD FOR MINIMIZING CURE-INDUCED RESIDUAL STRESS IN AN EPOXY IMPREGNATED IGNITION COIL

BACKGROUND OF THE INVENTION

1. Technical Field

The present invention relates generally to a system and method for minimizing cure-induced residual stress in an epoxy resin impregnated apparatus, and more particularly, to an epoxy resin impregnated ignition coil, in one embodiment.

2. Discussion of the Background Art

Ignition coils are known for use in connection with an internal combustion engine, such as an automobile engine, and which include a primary winding, a secondary winding and a magnetic circuit. The magnetic circuit conventionally may comprise a cylindrical-shaped, central core extending along an axis and located radially inwardly of the primary and secondary windings and magnetically coupled thereto. These components are contained in a case formed of electrical insulating material, and may optionally include an outer core or shield located outside of the case. It is known to introduce an encapsulant, such as an epoxy resin, into the ignition coil, as seen by reference to U.S. Pat. No. 6,178,957 entitled "PENCIL IGNITION COIL ASSEMBLY MODULE" issued to Widiger et al. Widiger et al. further disclose that the encapsulant is introduced in liquid form and is allowed to flow into the interior of the primary bobbin and fill an annular space surrounding the secondary bobbin and secondary coil, and is further introduced to bring the level sufficient to fully cover the components. Widiger et al. further disclose that the material is allowed to cure. However, there are shortcomings associated with the above-described conventional encapsulation/curing approach. One problem is that when the encapsulant (e.g., epoxy resin) is cured, chemical shrinkage occurs, leaving voids, and resulting in small gaps at critical interfaces. In context, it should be understood that for an ignition coil, the epoxy protects hair thin wires, providing both electrical insulation, as well as environmental isolation from environmental factors that the ignition coil may encounter during its service life. By way of example, as shown in FIG. 5, a conventional approach for curing the epoxy resin involves a two-step process, which is shown as trace 102. That is, in a first step, the temperature (ambient) is brought up to a first level and is held for a predetermined time. The next step involves raising the ambient temperature to a second, higher level. It is held at this second temperature for another, second predetermined time. The resulting residual stress in the epoxy, which is shown as trace 104, is substantial, particularly during the "second" step increase in temperature. The rapid increase in the tension represents interfacial stress, which results in a loss of adhesion between the epoxy resin and the components it is intended to encapsulate, for example, a secondary winding wire. A separation may result in microarcing during operation of the ignition coil, which can eventually break down the materials in the ignition coil, causing it to short and fail. Therefore, the cure-induced stress, in conventional encapsulation/curing approaches, results in a less than optimal outcome.

In the art, it is known to provide a closed loop feedback system which employs thermal expansion to counteract the stresses resulting from chemical shrinkage, as disclosed in an article entitled "A NEW METHOD TO REDUCE CURE-INDUCED STRESSES IN THERMOSET POLYMER COMPOSITES, PART II: CLOSED LOOP FEEDBACK CONTROL SYSTEM" by Genidy et al., Journal of Composite Materials, Volume 34 (hereinafter referred to as the Cure Induced Stress Test or "CIST" article). The CIST article discloses an apparatus that measures strain on a thin carbon fiber produced through a gel-cure cycle of an epoxy resin. The apparatus includes closed-loop feedback to reduce the cure-induced stress during the gel-cure cycle. However, the CIST article assumes that the epoxy resin that is being cured is isothermal throughout its volume, and is equal to the surrounding ambient temperature. This is a significant limitation, however, inasmuch as most practical encapsulation/curing applications do not conform to the isothermal model used in the CIST article. Accordingly, simply following the teachings of the CIST article would not result in minimizing stress under non isothermal conditions.

Another shortcoming with conventional encapsulation/curing approaches involve the relatively lengthy times required for curing the epoxy resin. In a production scenario, increased cure times result in decreased throughput and productivity, and may become bottlenecks.

There is therefore a need for an improved system that minimizes or eliminates one or more of the shortcomings set forth above.

SUMMARY OF THE INVENTION

An object of the present invention is to solve one or more of the problems as set forth above. A method and apparatus according to the present invention overcomes the shortcomings of conventional encapsulation/curing approaches to provide an optimal stress profile during the gel/cure cycle, thereby reducing or eliminating voids and separations between the epoxy resin and the component being encapsulated, and, further yielding stronger adhesion therebetween. Because of these improved characteristics, product failures resulting from the failure mode of epoxy separation and/or epoxy voids has been substantially reduced or eliminated.

A method for making an apparatus according to the invention includes a couple of basic steps. First, potting the apparatus, namely, surrounding an electrical portion of the apparatus with epoxy resin so as to encapsulate the electrical portion. Secondly, heating the apparatus according to a temperature profile. According to the invention, the temperature profile is determined as a function of (i) a minimum cure-induced stress profile associated with the epoxy resin itself, and (ii) a composite thermal transfer function associated with the apparatus. Conventional approaches assume isothermal gel/cure conditions, and, not surprisingly, do not even recognize the problem of temperature gradients within the apparatus being potted, much less provide any solutions. The present invention characterizes the apparatus being potted from a thermal perspective, determining the relationship between commanded temperature (i.e., the temperature driven in the interior of an oven, for example), and the responsive temperature at one or more different points in the interior of the apparatus where the epoxy resin is being cured. Control of the temperature where the epoxy resin is being cured is essential if the minimum cure induced stress is to be realized. The present invention enables realizing the full potential of cure induced stress profiling for non-isothermal conditions (i.e., most real-world conditions). In a preferred embodiment, the method of heating the apparatus is performed by the substep of controlling an oven in accordance with the determined temperature profile described above. The present invention has applicability toward a wide range of apparatus, and in a constructed embodiment, is applied to an ignition coil.

In a still further preferred embodiment, a method for minimizing a gel-cure cycle duration having minimized residual stress is provided. In particular, the method includes increasing the initial gel isotherm temperature, having due regard for the cure-induced stress profile for the epoxy resin material being used, as well as the thermal transfer function associated with the apparatus. That is, the heat involved in the curing of the epoxy resin material is time-temperature independent. There are therefore multiple time-temperature profiles that traverse the degree of cure path from 0% to 100%. The amount of heat introduced into the chemical action that accomplishes curing of the epoxy resin is advanced relative to, for example, manufacturer's recommended time-temperature profiles. Gel-cure cycle times can be reduced 50% or more through the foregoing approach, thereby improving throughput and productivity, eliminating potential bottleneck situations.

A system corresponding to the inventive method is also presented.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 1:
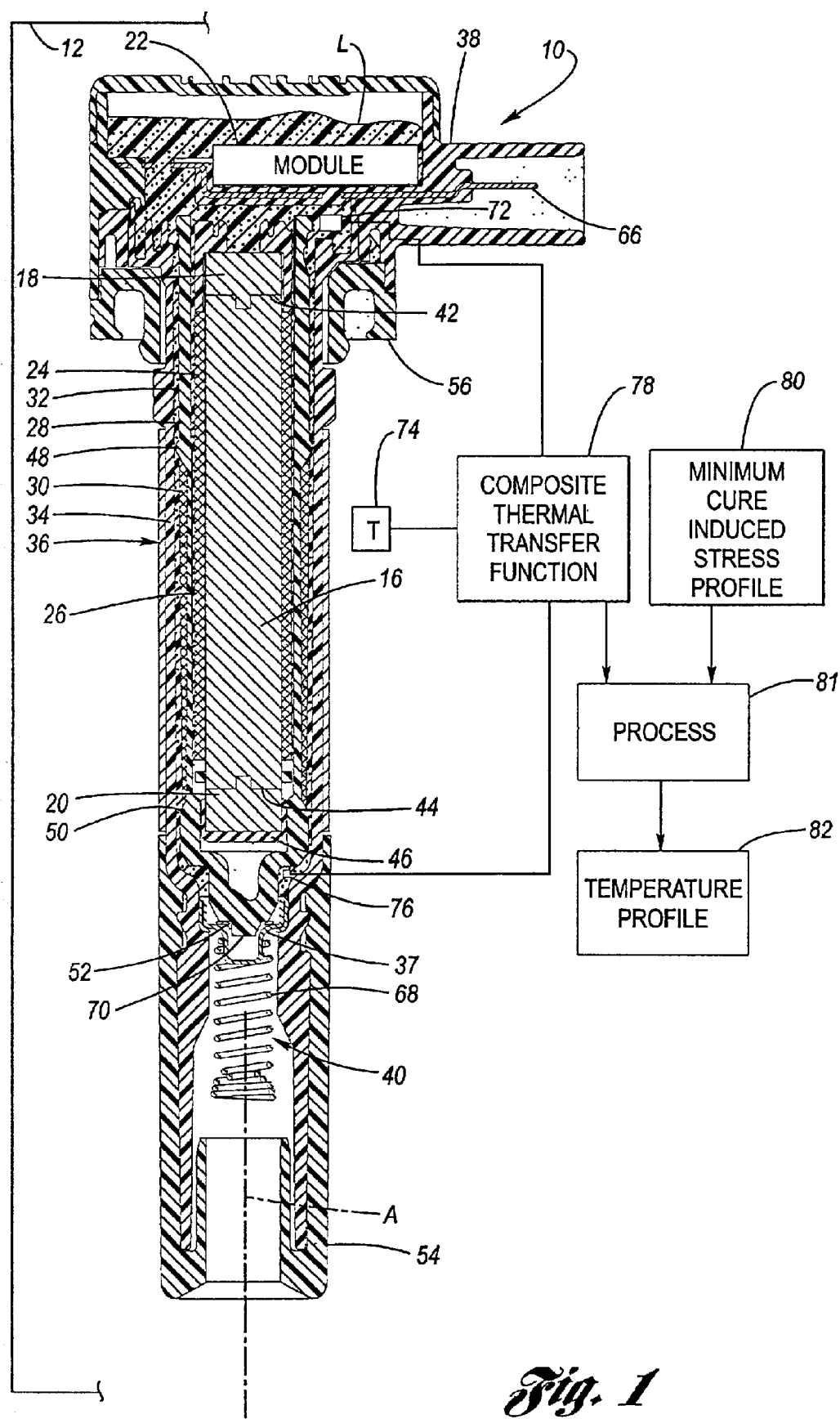
FIG. 1 a simplified cross-sectional view of an ignition coil disposed in an oven arranged for determining the composite thermal transfer function of the ignition coil, and the subsequent generation of a desired temperature profile.

Referring now to the drawings wherein like reference numerals are used to identify identical components in the various views, FIG. 1 is a simplified, cross-section view of an ignition apparatus or coil 10. Ignition coil 10 is illustrated for example purposes only, it being understood that the present invention may be applied to a variety of apparatus or devices being potted using epoxy resin or some other encapsulant where non-isothermal conditions apply. As described in the Background, system is known for performing a cure-induced stress test (CIST) and generating a time-temperature profile, which if followed during a cure cycle, will result in a reduced residual stress. However, the CIST technology as described in the art is useful only for isothermal configurations. FIG. 1 shows an arrangement acquiring empirical thermal profile data in order to produce a composite thermal transfer function. The thermal transfer function characterizes the thermal response of the apparatus being potted, namely that of the ignition coil 10. The arrangement in FIG. 1 further shows how the composite thermal transfer function can be used, in conjunction with a minimum cure induced stress profile of the epoxy resin being used, to arrive at an optimal oven time-temperature profile. It bears emphasizing that the CIST technology itself is insufficient to produce a minimum residual stress gel-cure cycle for non-isothermal conditions, such as may exist in ignition coil 10 during a cure cycle. It is not enough simply to know the oven temperature because the oven temperature affects the internal temperatures at different points in a wide variety of ways. The variation in internal temperature is affected by, among other things, the thermal conductivity of the various components that make up the total apparatus, as well as the particular chemistry of the epoxy resin being used at the specific temperature being considered.

The term "potting," "potted" and variations thereof are used throughout this description, and, as used herein, refers to a process wherein an encapsulant is introduced in liquid form and is allowed to flow into the interior of the object being "potted."

Ignition coil 10 is of the type adapted for installation to a conventional internal combustion engine, through a spark plug well, onto a high-voltage terminal of a spark plug (not shown). The spark plug may be retained to the engine by a threaded engagement with a spark plug opening in the engine. To further illustrate the complexity involved in thermal transfers into ignition coil 10, a brief description of its component parts will be described.

FIG. 1 further shows a central, generally cylindrical magnetically-permeable core 16, optional first and second magnets 18 and 20, an electrical module 22, a primary winding 24, a first annular layer of encapsulant such as an epoxy resin potting material 26, a secondary winding spool 28, a secondary winding 30, a second annular layer 32 of epoxy resin potting material, a case 34, an outer core or shield 36, an electrically conductive cup 37, a low voltage (LV) connector body 38, and a high-voltage (HV) connector assembly 40. Core 16 includes a top end 42 and a bottom end 44. FIG. 1 further shows a rubber buffer cup 46, and secondary spool 28 includes annular portions 48 and 50. FIG. 1 also shows a high voltage terminal 52, a boot 54 and a seal member 56. Note the variety of materials, ranging from thermal insulators to thermal conductors, the varying thickness of the various materials, as well as the relative locations of epoxy resin, relative to areas outside the ignition coil. Some areas of epoxy are deep within the ignition coil, while other areas are rather near the outer part of the coil. The first step of the invention involves deploying thermocouples inside the ignition coil in various locations to record how inside areas of resin respond (temperature-wise) to outside temperature influences.

Ignition coil 10 is thus equipped with a plurality of thermocouples, for example thermocouple 72 and 76 as well as at least one other thermocouple located external to ignition coil 10 to measure the temperature of the ambient surroundings. As shown in FIG. 1, in partial broken-line format, ignition coil 10 is disposed in an oven 12 or other similar heating apparatus. Thus, in the arrangement shown in FIG. 1, thermocouple 74 is configured to provide empirical data relating to the temperature of the ambient surroundings, while thermocouples 72 and 76, located in the interior of ignition coil 10, are used to measure the resulting, internal temperatures in the epoxy resin material, as a function of time, responsive to the ambient temperature changes. FIG. 1 further shows a block 78 for determining the composite thermal transfer function for the coil 10, based on inputs from the thermocouples 72, 74 and 76. FIG. 1 also shows a block 80 for determining a minimum cure induced stress profile, and a function block 81 for combining the outputs of blocks 78 and 80 to arrive at block 82, a desired temperature versus time profile for the oven in order to obtain optimal minimum cure induced stress.

Although only two thermocouples are shown being disposed in the interior of ignition coil 10, it should be understood that further thermocouples may be used to measure the response at a variety of different locations in an apparatus generally. In the context of an ignition coil 10, a preliminary investigation has shown that the region of epoxy resin material located near the top of ignition coil 10, for example in the general area of thermocouple 72, responds fairly directly (quickly) to changes in the ambient temperature, as controlled by oven 12. On the other hand, the location in ignition coil 10 containing epoxy material in the general region of thermocouple 76 responds far less quickly to changes in temperature in the ambient surroundings. As described above, the response characteristic is affected both by the thermal conductivities and capacitances of the materials in a given region, thicknesses, etc., as well as the relative chemistry of the epoxy resin at a given temperature. The chemistry of the epoxy resin changes from type to type, as well as a function of temperature even within a given type. Thus, even a particular epoxy type responds differently at say 65° C., versus at say 100° C. (both at the liquid phase). Moreover, the relative degree of cure of the epoxy material (liquid-to-gel-to-solid phase change) also affects temperature response characteristics.

Thus, under one strategy, the "high" and "low" response locations were equipped with thermocouples for data gathering. It should be understood that further thermocouples may be used, depending on the particular strategy to be used in formulating a composite thermal transfer function for the device being potted.

In any event, the initial step in producing the composite thermal transfer function for the ignition coil 10 involves preheating the ignition coil 10 so that any thermocouple-related offsets can be corrected, since after a preheat period of a certain duration, substantially isothermal initial conditions would apply within the ignition coil.

Next, epoxy resin is introduced into coil 10. The oven is run through different temperature profiles, and the temperature traces from thermocouples 72, 74 and 76 are used to create a mathematical model to represent the relationship between the true ambient temperature outside of the ignition coil, and the temperature at the thermocouple 72, and 76 embedded in the epoxy resin inside the coil.

The composite thermal transfer function ("model") is determined by block 78 by calculating the individual responses at the various points, then settling on a strategy for combining the individual thermal transfer functions into a composite thermal transfer function (more on this below). First, for a first point in the epoxy resin material, for example at the point where thermocouple 72 is located, a first thermal transfer function associated with the point is determined (using the empirical temperature versus time data, in view of the temperature versus time data of the oven—thermocouple 74. The form of the thermal transfer function may be an equation, which may be a curve fit in the form of equation (1). As will be seen, the internal part temperature is a function of the ambient temperature driving "force" (the oven heat).

$$T_{P2}=T_{P1}+k_1(T_{A1}-T_{P1})+k_2(T_{A1})+k_3 \qquad (1)$$

Where:

$T_{P2}$=Internal Part Temperature (° C.) at Time=2.

$T_{P1}$=Internal Part Temperature (° C.) at Time=1.

$T_{A1}$=Oven Ambient Temperature (° C.) at Time=1.

$k_1$=constant of integration proportional to the driving "force" of the oven $\Delta T$); (overall heat transfer coefficient)

$k_2$=constant of integration proportional to initial temperature (offset)

$k_3$=linear correction factor constant of integration

The constants $k_1$, $k_2$, and $k_3$ depend on the ambient temperature, due to the chemistry of the epoxy resin. Therefore, the relationship between the internal part temperature, and the ambient temperature driving force actually comprises a family of curves.

However, equation (1) above simply provides the internal part temperature as a function of the ambient (oven) temperature driving force. The only temperature that can be controlled is the oven temperature, not the internal part temperature. The benefits (i.e., minimized reduced residual stress) of the CIST technology are only obtained when the internal part temperature is controlled to the minimum cure induced stress time-temperature profile. The prior art assumes the ambient temperature and the internal part temperatures are the same (i.e., isothermal) as a function over time, however such a simplification does not apply for many apparatus, including an ignition coil. Accordingly, since the oven temperature is the temperature which can be controlled, the equation of FIG. 1 must be solved in reverse, i.e., the ambient profile must be determined from the internal part thermal profile. Solving equation (1) for ambient temperature then gives the equation shown in equation (2) below:

$$T_{A1} = \left(\frac{1}{k_1+k_2}\right)(T_{P2}+(k_1-1)T_{P1}-k_3) \qquad (2)$$

where, $T_{A1}$=Oven Ambient Temperature (° C.) at Time=1.

There may be configurations where the thermocouple 74 measuring the ambient surroundings may not completely and accurately reflect the oven driving temperature, in which case equation 3, below, can be provided to account for any offset.

$$T_{A1}=T_{DT}+k_4 \qquad (3)$$

where, $T_{DT}$=Oven Ambient Temperature (° C.) per Datatrace [correlates to programmed profile].

$k_4$=linear correction factor (offset).

The foregoing equations permit correlation of the measured internal part temperature with the programmed oven temperature profile, to define the first thermal transfer function for a first point in the ignition coil (e.g., where thermocouple 72 is located). This process is repeated for a second point in the epoxy resin to provide a second thermal transfer function, and so on for as many different points in the apparatus, as is desired or required by the subsequent combining function (to obtain the composite thermal transfer function).

Block 78 is also configured to determine a composite thermal transfer function of the apparatus as a whole. Various averaging techniques can be applied to calculate what is to be the "composite" function. For example, determining a composite thermal transfer function may involve a numeric, evenly weighted averaging of the first and second thermal transfer function to determine the composite thermal transfer function for the ignition coil 10. Alternatively, other averaging techniques other than a strict even-weighted averaging can be applied to yield a "best" profile for the entire ignition coil. Alternatively, block 78 may be configured to select either one of the first or second thermal transfer functions based on the specific, weakest location in the ignition coil (i.e., based on the strength of the epoxy resin material at the location being considered). For example, in the area near the high voltage terminal 52 in FIG. 1, particularly near thermocouple 76, it is particularly important that the epoxy resin material strongly adhere to its surrounding surfaces so as to avoid any gaps, or interfacial voids where microarcing can occur (due to the relatively high voltage generated at the high voltage end of the ignition coil which may be 10 kV or higher). In this regard, block 78 may thus be configured to select the thermal transfer function associated with the point where thermocouple 76 is located, or at least to more heavily weight that transfer function in generating an overall composite thermal transfer function for the ignition coil.

FIG. 1 also shows a minimum cure induced stress profile block 80. The output of the minimum cure induced stress profile block 80 is a time-temperature profile, for a particular epoxy resin material, that would yield the overall minimum stress during a gel-cure cycle. The profile is essentially a mechanical property of the epoxy resin material. Key in implementing the minimum cure induced stress profile is to control the temperature of the epoxy resin material so that it tracks the temperature trace over time. As mentioned above, however, the internal part temperature in the ignition coil cannot be controlled directly; only the oven temperature of oven 12 can be controlled, as a practical matter. Block 80 may be implemented using known technology (e.g., the CIST technology referred to above).

Processing block 81 takes as an input both (i) the composite thermal transfer function of the ignition coil, as well as (ii) the minimum cure induced stress profile from block 80. Processing block 81 produces a time-temperature profile 82, that predicts the oven temperature that will yield the internal part temperature(s) that tracks the minimum cure-induced stress profile trace over time, to thereby yield the minimum cure-induced residual stress in the epoxy resin in the ignition coil. Essentially, one approach may involve plugging in the desired temperatures (as a function of time) from the CIST profile into equation (2) to obtain the needed oven temperature. This is done over time.

It should be appreciated that the foregoing setup described in connection with FIG. 1 is in the nature of a data acquisition and configuration phase, and would not be performed on production runs of ignition coils. The purpose of the arrangement set forth in FIG. 1 is to generate the desired time-temperature profile, from which an oven can be controlled, and which is expected to provide a minimum cure-induced stress in the ignition coil itself.

Figure 2:
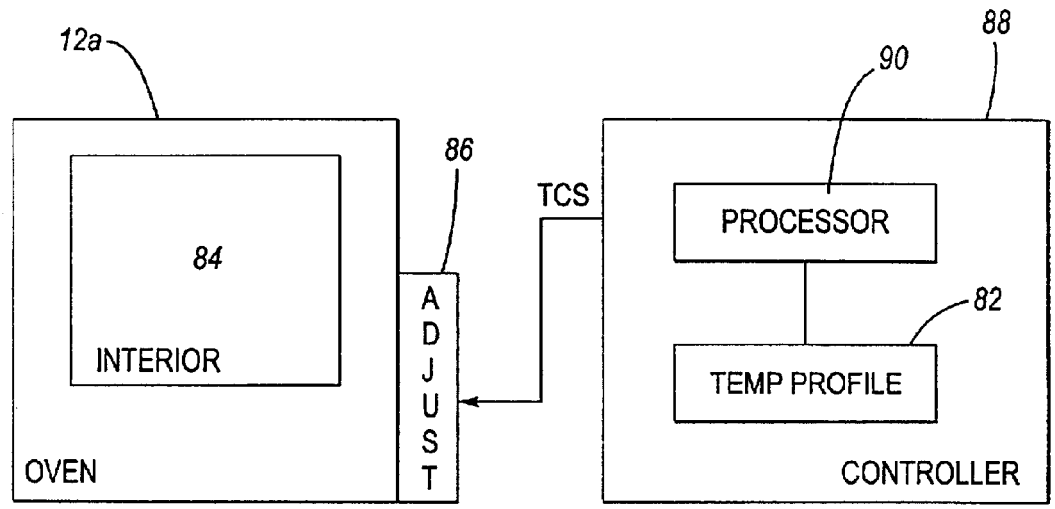
FIG. 2 is a simplified block diagram view of a system for performing the inventive method, using the temperature profile created by the arrangement shown in FIG. 1.

FIG. 2 shows a system arranged for gel-cure cycling of potted ignition coils. FIG. 2 shows an oven 12*a*, which may be the same as oven 12 used in FIG. 1 in establishing the composite thermal transfer function. FIG. 2 further shows oven 12*a* as including an interior 84, and a temperature adjust control unit 86. The oven 12*a* is configured to control a temperature of the interior 84 in accordance with a temperature control signal (TCS) as an input, for example, to temperature adjust unit 86. Oven 12*a* may comprise conventional and well-known apparatus, such as, for example only, any of the several commercial ovens commercially distributed by HUBERS, Bocholt, Germany.

FIG. 2 further shows a controller 88 having a central processor 90 in communication with the temperature-time profile 82 determined by the arrangement shown in FIG. 1. Profile 82 may be stored in a memory or the like. Controller 88 is configured to generate the temperature control signal (TCS) so that the temperature in the interior 84 of oven 12*a* conforms to the temperature-time profile 82, which is determined as a function of (i) a minimum cure-induced stress profile associated with the epoxy resin material used in ignition coil 10 and (ii) a composite thermal transfer function, as determined in block 78 of FIG. 1. It should be understood that the system of FIG. 2 is exemplary only. The controller 88 may be integrated with oven 12*a*, in the fashion of a programmable oven (e.g., one of the Huber models referred to above).

Figure 3:
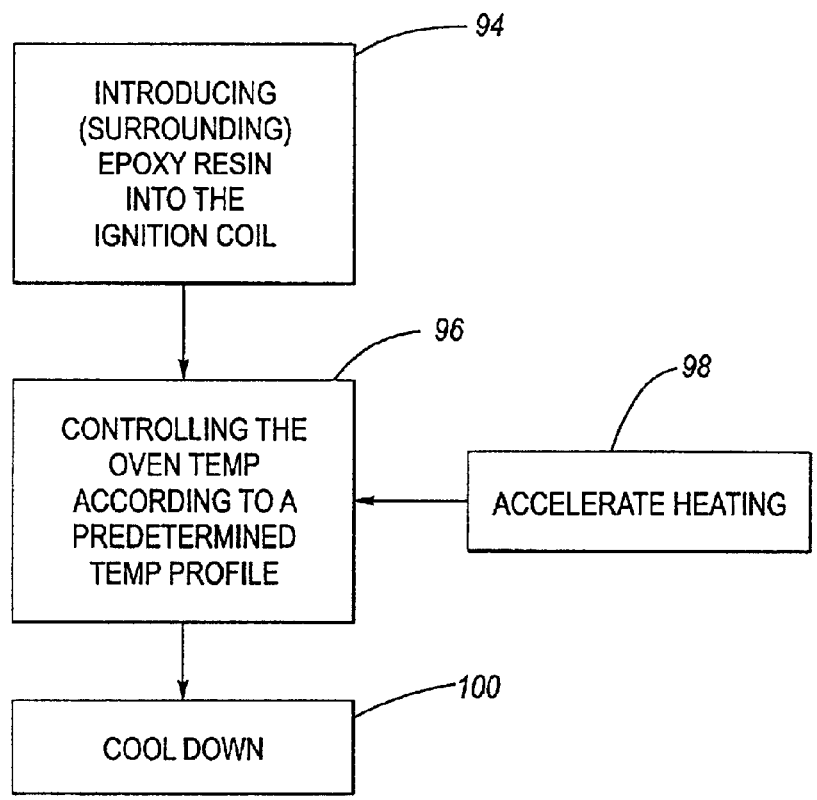
FIG. 3 is a simplified flowchart diagram illustrating the steps of the inventive method.

FIG. 3 is a simplified flowchart diagram showing the basic method steps according to the present invention.

Step 94 involves introducing an encapsulant into the apparatus being potted. This may involve surrounding an electrical portion of the apparatus with the encapsulant so as to surround the electrical portion. As shown in FIG. 1, introducing the encapsulant, such as epoxy resin material into the central interior of the ignition coil 10 allows the epoxy resin material to flow distally, downwardly in a general direction of longitudinal axis A, and into the radial clearance between an outside surface of primary winding, and an inside surface of secondary spool 28, as well as between an outside surface of secondary spool 28 and secondary winding 30, on the one hand, and the inside surface of case 34, on the other hand. Epoxy resin material flows all the way down into the high voltage area adjacent to and near the high voltage terminal 52, and high voltage cup 37. Epoxy resin material is then added until it reaches a predetermined level, designated "L" in FIG. 1. The method then proceeds to step 96.

Step 96 involves controlling the oven temperature using the temperature control signal in accordance with the predetermined temperature profile 82. In another aspect of the present invention, optionally, step 98 may be applied. If not, the method proceeds to step 100.

With continued reference to FIG. 3, the method proceeds to step 100, which involves a cool down phase. The ignition coils may then be removed from the oven, for further processing.

Otherwise, if step 98 is performed, it involves accelerating the introduction of heat into the curing process. As described above, the curing process involves a substantially constant amount of heat, and may take any one of a plurality of independent time-temperature paths. The application of heat in a relatively slow, gentle gel-cure cycle (i.e., usually in excess of four hours) is accelerated by increasing the initial gel isotherm temperature. An accelerated minimal-stress profile can be mathematically transformed to provide an oven ambient temperature profile that exactly reproduces the minimal stress profiles in the epoxy resin material in the ignition coil itself. For a particular thermoset material, a phase change will occur during cure in which the initial liquid phase changes to a semi-crystalline phase. It is known in the art to describe the relative fraction of the total heat that has taken place in the reaction as a fraction, referred to as a degree of cure, as a percent. For example, in one embodiment, a phase change occurs between about 70–78% degree of cure. Since the total change in entropy is fixed for the exothermic reaction and is time-temperature, path independent, an increase in the initial isotherm temperature (i.e., the constant holding temperature that is usually applied as a first interval during a gel-cure cycle) will advance the exothermic reaction to the degree of cure where the phase change occurs in a more rapid fashion. Adjustments to the remaining time-temperature profile can be made, in accordance with the above-described first aspect of the invention, to provide a minimized stress cure.

Figure 4:
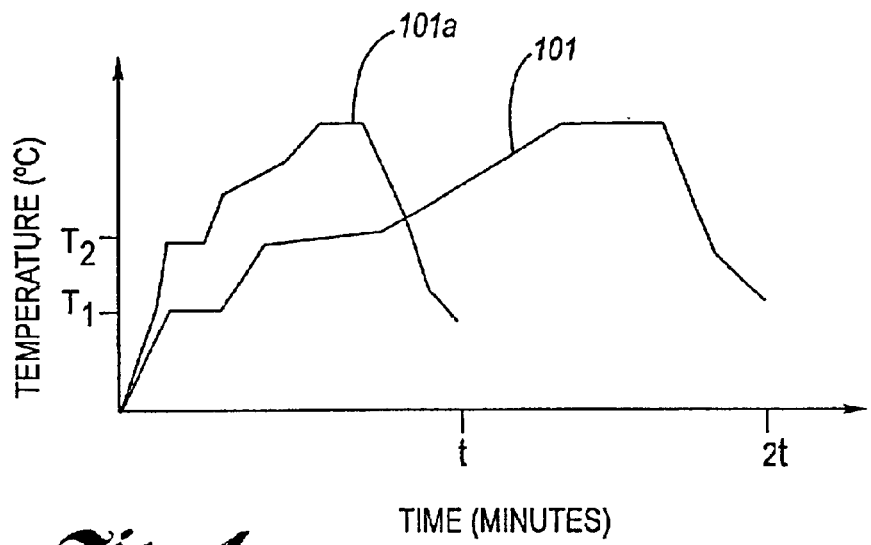
FIG. 4 shows a normal and an accelerated cure profile according to the invention.

As shown in FIG. 4, a first time-temperature profile 101, shown in solid-line format, extends over a time period designated 2t minutes, with an initial isotherm temperature of about $T_1$, with a subsequent temperature increase from $T_1$ to $T_2$. The accelerated time-temperature profile 101a, shown in dashed-line format, has an increased initial isotherm temperature $T_2$. This accelerates movement through the degree of cure curve. The overall approach has a reduced duration, illustrated in exemplary fashion as enduring t minutes.

EXAMPLE

Figure 5:
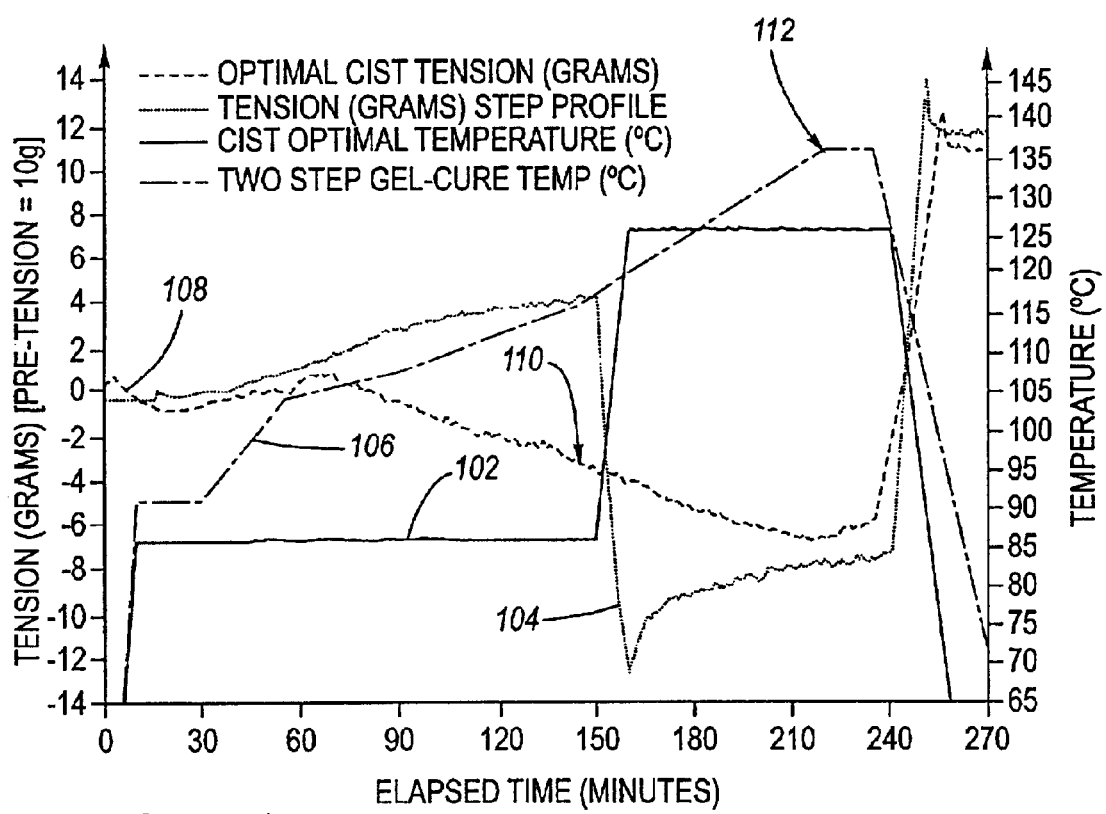
FIG. 5 is a simplified tension versus time versus temperature grid, showing an exemplary temperature profile, and the residual stress resulting from a gel cure cycle for an ignition coil embodiment.

FIG. 5 shows a particular time-temperature profile according to the invention, designated trace 106. Trace corresponds to profile 82 described above and shown in FIGS. 1 and 2. This is the oven temperature. The corresponding minimized output tension is shown as trace 108. A conventional temperature profile is shown as trace 102, with a corresponding stress shown as trace 104. The epoxy resin material employed in the example is designated ESO 505, available from Dexter Electronic Materials Division. As shown between about times 60 minutes and 150 minutes, a gradual temperature increase (thermal expansion) is provided throughout the gel-cure process to offset chemical shrinkage. The approach provides a gradual reduction in the tension, and represents an elimination of interfacial stresses. For example, an interfacial stress might otherwise occur where the epoxy resin material meets outer surface of the secondary winding. The gradual reduction in stress shown generally in the region labeled 110 of trace 108. In addition, the time-temperature profile 106 according to the invention also exhibits a relatively increased final cure temperature, shown generally in region 112 of trace 106, which results in a stronger adhesion between the epoxy resin and the material surfaces surrounded by the resin. Note, that the present invention eliminates the rapid increase in tension at the cure temperature, representing interfacial stress and a loss of adhesion, characteristic of the prior art, shown in trace 104 between times 150 minutes and 180 minutes.

Ignition Coil 10 Construction

The following is a detailed description of the exemplary ignition coil shown in FIG. 1. It should be understood that the following is exemplary, and not limiting in nature. The purpose of the following description being included in the present invention is to provide a range of typical materials, geometries, and the like. It should be understood that the principles of the present invention may be applied to other apparatus, and remain within the spirit and scope of the present invention.

Core 16 may be elongated, having a main, longitudinal axis "A" associated therewith. Core 16 includes an upper, first end 42, and a lower, second end 44. Core 16 may be a conventional core known to those of ordinary skill in the art. As illustrated, core 16, in the preferred embodiment, takes a generally cylindrical shape (which is a generally circular shape in radial cross-section), and may comprise compression molded insulated iron particles or laminated steel plates, both as known.

Magnets 18 and 20 may be included in ignition apparatus 10 as part of the magnetic circuit, and provide a magnetic bias for improved performance. The construction of magnets such as magnets 18 and 20, as well as their use and effect on performance, is well understood by those of ordinary skill in the art. It should be understood that magnets 18 and 20 are optional in ignition apparatus 10, and may be omitted, albeit with a reduced level of performance, which may be acceptable, depending on performance requirements. A rubber buffer cup 46 may be included.

Primary winding 24 may be wound directly onto core 16 in a manner known in the art. Primary winding 24 includes first and second ends and is configured to carry a primary current $I_P$ for charging apparatus 10 upon control of ignition system 12. Winding 24 may be implemented using known approaches and conventional materials. Although not shown, primary winding 24 may be wound on a primary winding spool (not shown) in certain circumstances (e.g. when steel laminations are used).

Layers 26 and 32 comprise an encapsulant suitable for providing electrical insulation within ignition apparatus 10. In a preferred embodiment, the encapsulant comprises epoxy potting material. The epoxy potting material introduced in layers 26, and 32 may be introduced into annular potting channels defined (i) between primary winding 24 and secondary winding spool 28, and, (ii) between secondary winding 30 and case 34. The potting channels are filled with potting material, in the illustrated embodiment, up to approximately the level designated "L" in FIG. 1. In one embodiment, layer 26 may be between about 0.1 mm and 1.0 mm thick. Of course, a variety of other thicknesses are possible depending on flow characteristics and insulating characteristics of the encapsulant and the design of the coil 10. The potting material also provides protection from environmental factors which may be encountered during the service life of ignition apparatus 10. There is a number of suitable epoxy potting materials well known to those of ordinary skill in the art as described above.

Secondary winding spool 28 is configured to receive and retain secondary winding 30. In addition to the features described above, spool 28 is further characterized as follows. Spool 28 is disposed adjacent to and radially outwardly of the central components comprising core 16, primary winding 24, and epoxy potting layer 26, and, preferably, is in coaxial relationship therewith. Spool 28 may comprise any one of a number of conventional spool configurations known to those of ordinary skill in the art. In the illustrated embodiment, spool 28 is configured to receive one continuous secondary winding (e.g., progressive winding) on an outer surface thereof, as is known. However, it should be understood that other configurations may be employed, such as, for example only, a configuration adapted for use with a segmented winding strategy (e.g., a spool of the type having a plurality of axially spaced ribs forming a plurality of channels therebetween for accepting windings) as known.

The depth of the secondary winding in the illustrated embodiment may decrease from the top of spool 28 (i.e., near the upper end 42 of core 16), to the other end of spool 28 (i.e., near the lower end 44) by way of a progressive gradual flare of the spool body. The result of the flare or taper is to increase the radial distance (i.e., taken with respect to axis "A") between primary winding 24 and secondary winding 30, progressively, from the top to the bottom. As is known in the art, the voltage gradient in the axial direction, which increases toward the spark plug end (i.e., high voltage end) of the secondary winding, may require increased dielectric insulation between the secondary and primary windings, and, may be provided for by way of the progressively increased separation between the secondary and primary windings.

Spool 28 is formed generally of electrical insulating material having properties suitable for use in a relatively high temperature environment. For example, spool 28 may comprise plastic material such as PPO/PS (e.g., NORYL available from General Electric) or polybutylene terephthalate (PBT) thermoplastic polyester. It should be understood that there are a variety of alternative materials that may be used for spool 28 known to those of ordinary skill in the ignition art, the foregoing being exemplary only and not limiting in nature.

Spool 28 may further include a first and second annular feature 48 and 50 formed at axially opposite ends thereof. Features 48 and 50 may be configured so as to engage an inner surface of case 34 to locate, align, and center the spool 28 in the cavity of case 34.

As described above, spool 28 includes an electrically conductive (i.e., metal) high-voltage (HV) terminal 52 disposed therein configured to engage cup 37, which in turn is electrically connected to the HV connector assembly 40. The body of spool 28 at a lower end thereof is configured so as to be press-fit into the interior of cup 37 (i.e., the spool gate portion).

FIG. 1 also shows secondary winding 30 in cross-section. Secondary winding 30, as described above, is wound on spool 28, and includes a low voltage end and a high voltage end. The low voltage end may be connected to ground by way of a ground connection through LV connector body 38 in a manner known to those of ordinary skill in the art. The high voltage end is connected to HV terminal 52. Winding 30 may be implemented using conventional approaches and material known to those of ordinary skill in the art.

Case 34 includes an inner, generally enlarged cylindrical surface, an outer surface, a first annular shoulder, a flange, an upper through-bore, and a lower through bore.

The inner surface of case 34 is configured in size to receive and retain spool 28 which contains the core 16 and primary winding 24. The inner surface of case 34 may be slightly spaced from spool 28, particularly the annular spacing features 48, 50 thereof (as shown), or may engage the spacing features 48, 50.

Case 34 is formed of electrical insulating material, and may comprise conventional materials known to those of ordinary skill in the art (e.g., the PBT thermoplastic polyester material referred to above).

Shield 36 is generally annular in shape and is disposed radially outwardly of case 34, and, preferably, engages an outer surface of case 34. The shield 36 preferably comprises electrically conductive material, and, more preferably metal, such as silicon steel or other adequate magnetic material. Shield 36 provides not only a protective barrier for ignition apparatus 10 generally, but, further, provides a magnetic path for the magnetic circuit portion of ignition apparatus 10. Shield 36 may nominally be about 0.50 mm thick, in one embodiment. Shield 36 may be grounded by way of an internal grounding strap, finger or the like (not shown) well know to those of ordinary skill in the art. Shield 36 may comprise multiple, individual sheets 36, as shown.

Low voltage connector body 38 is configured to, among other things, electrically connect the first and second ends of primary winding 24 to an energization source, such as, the energization circuitry included in ignition system 12. Connector body 38 is generally formed of electrical insulating material, but also includes a plurality of electrically conductive output terminals 66 (e.g., pins for ground, primary winding leads, etc.). Terminals 66 are coupled electrically, internally through connector body 38, in a manner known to those of ordinary skill in the art, and are thereafter connected to various parts of apparatus 10, also in a manner generally know to those of ordinary skill in the art.

HV connector assembly 40 may include a spring contact 68 or the like, which is electrically coupled to cup 37. Contact spring 68 is in turn configured to engage a high-voltage connector terminal of spark plug 14. This arrangement for coupling the high voltage developed by secondary winding 30 to plug 14 is exemplary only; a number of alternative connector arrangements, particularly spring-biased arrangements, are known in the art.

What is claimed is:

1. A method making an apparatus comprising the steps of:
   (A) surrounding an electrical portion of the apparatus with epoxy resin;
   (B) heating the apparatus according to a temperature profile determined as a function of (i) a minimum cure-induced-stress profile associated with the epoxy resin and (ii) a composite thermal transfer function associated with the apparatus.

2. The method of claim 1 further comprising the steps of:
   defining a first point in the epoxy resin adjacent to the electrical portion, the point having a first thermal transfer function associated therewith relative to ambient surroundings;
   defining a second point in the epoxy resin different from the first point, the second point having a second thermal transfer function associated therewith relative to ambient surroundings; and
   calculating a weighted average of the first and second thermal transfer functions to determine the composite thermal transfer function for the apparatus.

3. The method of claim 1 further comprising the steps of:
   defining a first point in the epoxy resin adjacent to the electrical portion, the first point having a first thermal transfer function associated therewith relative to ambient surroundings;
   defining a second point in the epoxy resin different from the first point, the second point having a second thermal transfer function associated therewith relative to ambient surrounding; and
   selecting one of the first and second thermal transfer functions based on a strength parameter associated with the epoxy resin at the first and second points to define the composite thermal transfer function for the apparatus.

4. The method of claim 1 wherein said heating step is performed by the substep of:
   controlling an oven according to the temperature profile.

5. The method of claim 1 wherein said apparatus comprises an ignition apparatus having a cylindrical central core, a primary and a secondary winding radially outwardly of the central core, and a case of electrical insulating material outwardly of the primary and secondary windings, the step of surrounding the electrical portion with epoxy resin being performed by the substep of:
   introducing the epoxy resin between an inside surface of the case and an outside surface of the primary and secondary windings.

6. The method of claim 5 wherein the primary winding is radially inwardly of the secondary winding, the secondary winding being disposed on a secondary spool, said introducing step further including introducing the epoxy resin between an inside surface of the secondary spool and an outside surface of the primary winding.

7. The method of claim 1 further including the step of:
   conducting a cure-induced stress test (CIST) on the epoxy resin to produce the minimum cure induced stress profile.

8. A method making an ignition coil comprising the steps of:
- (A) surrounding an electrical portion of the coil with epoxy resin so as to encapsulate the electrical portion;
- (B) heating the ignition coil according to a temperature profile determined as a function of (i) a minimum cure-induced-stress profile associated with the epoxy resin and (ii) a composite thermal transfer function associated with the igniton coil.

9. The method of claim 8 further comprising the steps of:
- defining a first point in the epoxy resin adjacent to the electrical portion, the point having a first thermal transfer function associated therewith relative to ambient surroundings;
- defining a second point in the epoxy resin different from the first point, the second point having a second thermal transfer function associated therewith relative to ambient surroundings; and
- calculating a weighted average of the first and second thermal transfer functions to determine the composite thermal transfer function for the apparatus.

10. The method of claim 9 further comprising the steps of:
- defining a first point in the epoxy resin adjacent to the electrical portion, the first point having a first thermal transfer function associated therewith relative to ambient surroundings;
- defining a second point in the epoxy resin different from the first point, the second point having a second thermal transfer function associated therewith relative to ambient surrounding; and
- selecting one of the first and second thermal transfer functions based on a strength parameter associated with the epoxy resin at the first and second points to define the composite thermal transfer function for the apparatus.

11. The method of claim 8 wherein said heating step is performed by the substep of:
- controlling an oven according to the temperature profile.

12. The method of claim 8 wherein the ignition coil comprises a cylindrical central core, a primary and a secondary winding radially outwardly of the central core, and a case of electrical insulating material outwardly of the primary and secondary windings, the step of surrounding the electrical portion with epoxy resin being performed by the substep of:
- introducing the epoxy resin between an inside surface of the case and an outside surface of the primary and secondary windings.

13. The method of claim 12 wherein the primary winding is radially inwardly of the secondary winding, the secondary winding being disposed on a secondary spool, said introducing step further including introducing the epoxy resin between an inside surface of the secondary spool and an outside surface of the primary winding.

14. The method of claim 9 further including the step of:
- conducting a cure-induced stress test (CIST) on the epoxy resin to produce the minimum cure induced stress profile; and
- disposing at least a pair of temperature sensors in the ignition coil and using respective outputs from the temperature sensors to define the first and second thermal transfer functions.

15. A system for curing an apparatus having an electrical portion surrounded by epoxy resin so as to encapsulate the electrical portion, said system comprising:
- an oven having an interior, said oven being configured to control a temperature of said interior in accordance with a temperature control signal; a controller configured to generate said temperature control signal so that said temperature of said interior conforms to a temperature profile over time, said temperature profile being determined as a function of (i) a minimum cure-induced-stress profile associated with said epoxy resin and (ii) a composite thermal transfer function between said interior of said oven and an interior of said apparatus.

* * * * *